US010558851B2

(12) United States Patent
Nakano et al.

(10) Patent No.: US 10,558,851 B2
(45) Date of Patent: Feb. 11, 2020

(54) IMAGE PROCESSING APPARATUS AND METHOD OF GENERATING FACE IMAGE

(71) Applicant: CANON KABUSHIKI KAISHA, Tokyo (JP)

(72) Inventors: Shunsuke Nakano, Kawasaki (JP); Hiroshi Sato, Kawasaki (JP); Yuji Kaneda, Kawasaki (JP); Atsuo Nomoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/059,820

(22) Filed: Mar. 3, 2016

(65) Prior Publication Data

US 2016/0267339 A1 Sep. 15, 2016

(30) Foreign Application Priority Data

Mar. 11, 2015 (JP) .................................. 2015-048766

(51) Int. Cl.
*G06K 9/00* (2006.01)
*G06T 3/00* (2006.01)
*G06T 11/00* (2006.01)

(52) U.S. Cl.
CPC ..... *G06K 9/00302* (2013.01); *G06K 9/00228* (2013.01); *G06K 9/00268* (2013.01);
(Continued)

(58) Field of Classification Search
CPC ........... G06K 9/00228; G06K 9/00261; G06K 9/00295; G06K 9/00302; G06K 9/00926; G06K 9/00268; G06T 11/00; G06T 3/00
See application file for complete search history.

(56) References Cited

U.S. PATENT DOCUMENTS 7,010,144 B1* 3/2006 Davis .................... G06T 1/0021
382/100
8,085,982 B1* 12/2011 Kim .................... G06K 9/00261
382/100
(Continued)

FOREIGN PATENT DOCUMENTS

JP 2012008816 A 1/2012
JP 2014199519 A 10/2014

OTHER PUBLICATIONS

Tang et al. ("Face sketch recognition," IEEE Transactions on Circuits and Systems for Video Technology, vol. 14(1), Jan. 2004).*

(Continued)

*Primary Examiner* — Yubin Hung
(74) *Attorney, Agent, or Firm* — Carter, DeLuca & Farrell LLP

(57) ABSTRACT

An image processing apparatus stores, as instance images, a plurality of face images obtained by photographing respective faces of a plurality of persons on a plurality of photographing conditions, while associating the persons with the photographing conditions for each part; obtains the photographing condition of the input face image; approximates the respective parts of the input face images, by a combination of the instance images of the plurality of persons stored in association with the parts and the obtained photographing conditions; decides, for each part of the input face image, a combination corresponding to the combination in the approximation from the instance images of the plurality of persons stored in association with the part and a predetermined photographing condition; and generates an image obtained by photographing the input face image on the predetermined photographing condition, by synthesizing the obtained combination on the whole input face image.

14 Claims, 11 Drawing Sheets

(52) U.S. Cl.
CPC ............ *G06K 9/00295* (2013.01); *G06T 3/00* (2013.01); *G06T 11/00* (2013.01)

(56) References Cited

U.S. PATENT DOCUMENTS

| | | | | |
|---|---|---|---|---|
| 8,306,314 | B2* | 11/2012 | Tuzel | G06T 1/00 382/153 |
| 2002/0186878 | A1* | 12/2002 | Hoon | G01B 11/245 382/149 |
| 2006/0165293 | A1* | 7/2006 | Hamanaka | G06K 9/00228 382/209 |
| 2009/0016576 | A1* | 1/2009 | Goh | G06F 17/30256 382/118 |
| 2011/0075919 | A1* | 3/2011 | Gokturk | G06K 9/00288 382/159 |
| 2011/0293185 | A1* | 12/2011 | Silverbrook | H04N 1/00129 382/182 |
| 2012/0050494 | A1* | 3/2012 | Chen | G06T 15/205 348/48 |
| 2012/0102023 | A1* | 4/2012 | Osman | G11B 27/036 707/722 |
| 2012/0105467 | A1* | 5/2012 | Chao | G06Q 10/10 345/589 |
| 2012/0288166 | A1* | 11/2012 | Sun | G06K 9/00281 382/118 |
| 2012/0288167 | A1* | 11/2012 | Sun | G06K 9/00281 382/118 |
| 2012/0288186 | A1* | 11/2012 | Kohli | G06K 9/6256 382/159 |
| 2013/0120237 | A1* | 5/2013 | DiVerdi | G09G 5/00 345/156 |
| 2014/0191947 | A1* | 7/2014 | Sharma | G06F 3/0317 345/156 |
| 2015/0324630 | A1* | 11/2015 | Sandler | G06K 9/6267 382/118 |
| 2016/0034782 | A1 | 2/2016 | Nakano et al. | |

OTHER PUBLICATIONS

Zhang et al., "Face Recognition Across Pose: a Review", Computer Vision and Image Processing Lab, 2009, pp. 1-70.

Yi et al., "Towards Pose Robust Face Recognition", Center for Biometrics and Security Research & National Laboratory of Pattern Recognition, 2013, pp. 3539-3545.

Yin et al., "An Associate Predict Model for Face Recognition", 2011, pp. 497-504.

Cootes et al., "Active Shape Models—Their Training and Application", Computer Vision and Image Understanding, vol. 61, No. 1, 1995, pp. 38-59.

Li et al., "Support vector machine based multi-view face detection and recognition", Image and Vision Computing 22, 2004, pp. 413-427.

Tibshirani, "Regression shrinkage and selection via the lasso", Journal of the Royal Statistical Society, Series B (Methodological),vol. 58, Issue 1, 1996, pp. 267-288.

Georghiades et al., "Illumination Cones for Recognition Under Variable Lighting: Faces", CVPR '98 Proceedings of the IEEE Computer Society Conference on Computer Vision and Pattern Recognition, 1998, pp. 1-7.

U.S. Appl. No. 15/050,725, filed Feb. 23, 2016, Inventor(s) Daisuke Nishino et al.

Vetter et al., "Linear Object Classes and Image Synthesis From a Single Example Image," IEEE Transactions on Pattern Analysis and Machine Intelligence, vol. 19, No. 7, Jul. 1997, pp. 733-742.

Notification of Reasons for Refusal issued by the Japanese Patent Office on Mar. 19, 2019 in corresponding Japanese Patent Application No. 2015-048766 with English translation.

\* cited by examiner $$F = [f_1, f_2 \cdots f_N] \quad R = [r_1, r_2 \cdots r_N]$$

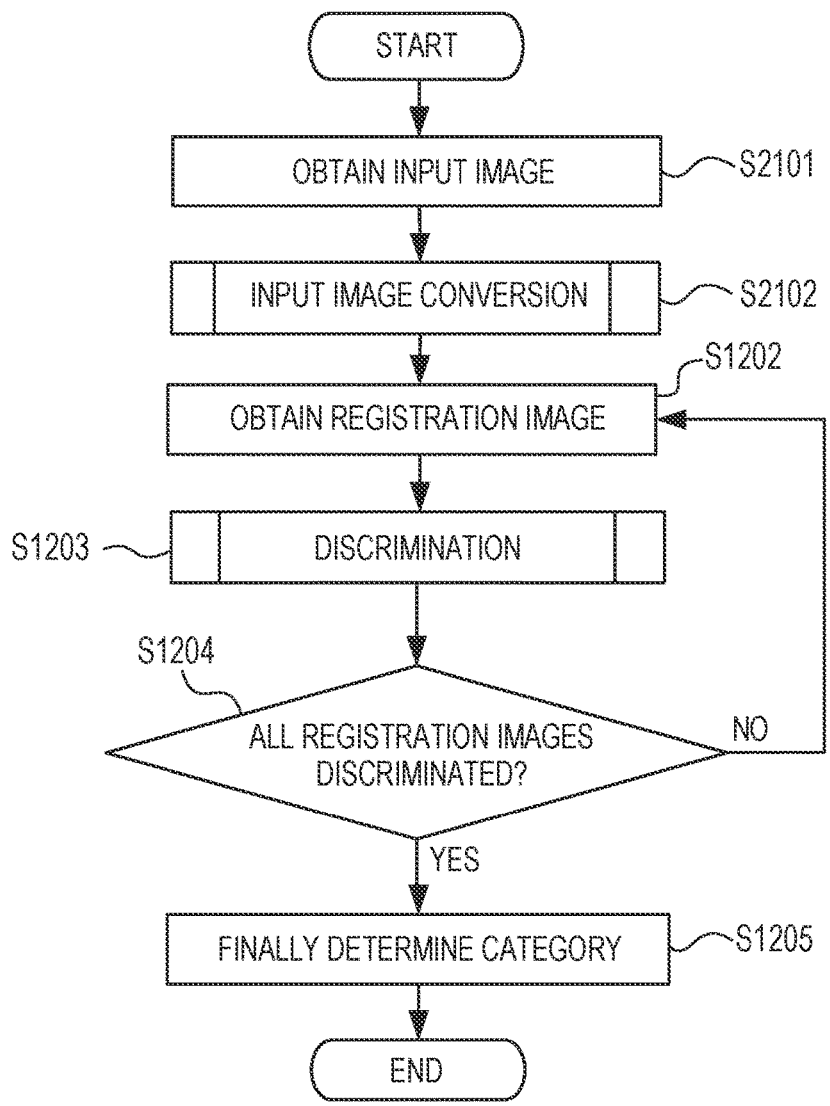

IMAGE PROCESSING APPARATUS AND METHOD OF GENERATING FACE IMAGE

BACKGROUND OF THE INVENTION

Field of the Invention

The present invention relates to image processing apparatus and method which generate a new face image based on an input face image.

Description of the Related Art

Many kinds of techniques of extracting useful information by highly processing an image of an object included in photographed and imaged image data. Among them, there is the technique called face recognition of recognizing a human face image and then determining the attribute of the face. As examples of the face recognition, there are sex estimation of estimating a sex of a person from his/her face, age estimation of estimating an age of a person from his/her face, face discrimination of determining whether or not two face images correspond to a same person, and the like.

In the face discrimination, an image variation due to different photographing conditions for the two face images to be compared seriously influences accuracy of the face discrimination. Here, the photographing conditions causing the image variation include an illumination condition, a look, hiddenness, a secular change, a face direction, and the like. The photographing condition will be described by taking the face direction as an example. Here, the face direction indicates from which direction the face should be photographed. Generally, the face has a complicated shape. Therefore, the appearance of the photographed image remarkably and quickly changes when the front face portion in the photographed image changes according to the face direction. Particularly, in the face discrimination, it has been known that a change of appearance of the face image due to a different face direction of a same person is larger than a change of the appearance of the face image due to a different person, so that the former change highly prevents person discrimination (see "Face Recognition Across Pose—Review" X. Zhang, Y Gao: 2009).

In the face discrimination, there are roughly two methods of reducing variation influence. One is the method of deleting the information of a variation and remaining only the information of an original (natural) face. For example, as a method to be used in regard to a face-direction variation, the image conversion as described in "Towards Pose Robust Face Recognition", D. Yi, Z. Lei, S. Z. Li: 2013 is representative. In this method, only the areas which are hardly influenced by the face-direction variation are compared to delete the face-direction variation. Therefore, since the areas of the face to be matched are reduced, there is a problem that the information of individual differences is deleted.

The other is the method of generating a new face image by estimating, from one face image, an appearance viewed on the photographing condition of the other face image, as described in "An Associate Predict Model for Face Recognition", Q. Yin, X. Tang, J. Sun: 2011 (hereinafter, called the literature by Yin). By this method, it is possible to discriminate the two faces on the premise that the respective photographing conditions are the same (i.e., there is no variation). In the literature by Yin, the process is performed for each of the parts such as the eye, the nose and the like of the input face. For example, with respect to the eye, the instance (or case example) images of the eyes of many persons and the instance images obtained by photographing the eye of the same person respectively on the different photographing conditions have been previously associated and held. In the process, from among the held instance images of the eyes, one image which is most similar to the input eye image is selected. Then, the instance image on another photographing condition corresponding to the selected instance image of the eye is selected. By performing the above process to all the parts such as the eye, the nose and the like, it is possible to generate the image which can be seen as if the input face is photographed on another photographing condition.

In the literature by Yin, if the instance images of the persons to be previously held can cover the universe, it is possible to adequately estimate an appearance to be obtained on another photographing condition even in a case where any kind of face image is input. However, the number of the persons capable of being really held is finite. As a result, when the held images do not contain a person sufficiently similar to the input face, an image dissimilar to the target person oneself is generated.

Thus, the present invention aims to generate an image which is similar to the input face even in the case where the instance images do not contain the person sufficiently similar to the input face.

SUMMARY OF THE INVENTION

According to one aspect of the present invention, there is provided an image processing apparatus which comprises: a storing unit configured to store, as instance images, a plurality of face images obtained by photographing respective faces of a plurality of persons on a plurality of photographing conditions, while associating the persons with the photographing conditions for each part; an obtaining unit configured to obtain the photographing condition of the input face image; an approximating unit configured to approximate the respective parts of the input face images, by a combination of the instance images of the plurality of persons stored in the storing unit in association with the parts and the photographing conditions obtained by the obtaining unit; a deciding unit configured to decide, for each part of the input face image, a combination corresponding to the combination by the approximating unit from the instance images of the plurality of persons stored in the storing unit in association with the part and a predetermined photographing condition; and a generating unit configured to generate an image obtained by photographing the input face image on the predetermined photographing condition, by synthesizing the combination obtained by the deciding unit on the whole of the input face image.

Further features of the present invention will become apparent from the following description of exemplary embodiments with reference to the attached drawings.

BRIEF DESCRIPTION OF THE DRAWINGS

FIG. 5 is a block diagram illustrating an example of the function constitutions of an image discriminating unit and the like.

FIG. 7 is a block diagram illustrating an example of the function constitutions of a registration image recording unit and the like.

FIG. 8 is a block diagram illustrating an example of the function constitutions of a variation data generating unit and the like.

FIG. 11 is a block diagram illustrating an example of the function constitutions of a registration image recording unit and the like.

FIG. 12 is a flow chart indicating an example of a category determining process.

FIG. 14 is a block diagram illustrating an example of the function constitutions of a variation data generating unit and the like.

DESCRIPTION OF THE EMBODIMENTS

Hereinafter, preferred embodiments of the present invention will be described in detail in accordance with the accompanying drawings.

First Embodiment

In the present embodiment, a human face is used as the object to be photographed by an imaging device. The process in the present embodiment will be described by taking face discrimination of discriminating a person from a face image as an example. As an example of a variation, a difference of sight due to the position relation between the object and the imaging device will be described. Here, the difference of sight due to the position relation between the object and the imaging device includes variations of the direction of the object in an image, the resolution of the object shown in an image (i.e., the size of the object in the image), and the like.

Figure 1A:
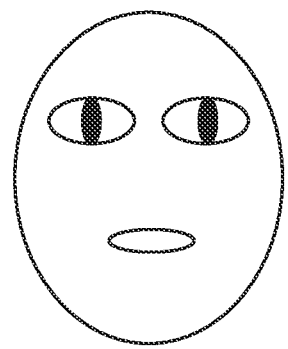
FIGS. 1A and 1B are diagrams illustrating an example of a variation due to face directions.
Figure 1B:
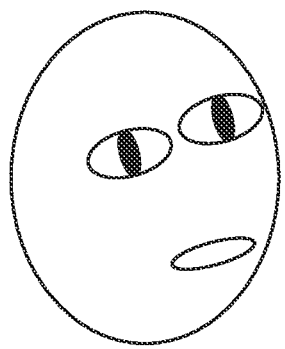

FIGS. 1A and 1B are diagrams illustrating an example of a variation due to face directions. More specifically, FIG. 1A illustrates a person's face photographed from the front, and FIG. 1B illustrates the state that the face of FIG. 1A turns to the right from the front (that is, the face is rotated in the yaw direction). In the present embodiment, for simplification, the process of treating the variation of the frontal face image (FIG. 1A) and the turning-right face image (FIG. 1B) will be described by taking only the variation of the angles in the yaw direction as an example. In the following, it is assumed that the difference of the photographing angles of the faces of FIGS. 1A and B in the yaw direction is the variation due to the face directions (the face-direction variation).

(Entire Constitution)

Figure 2:
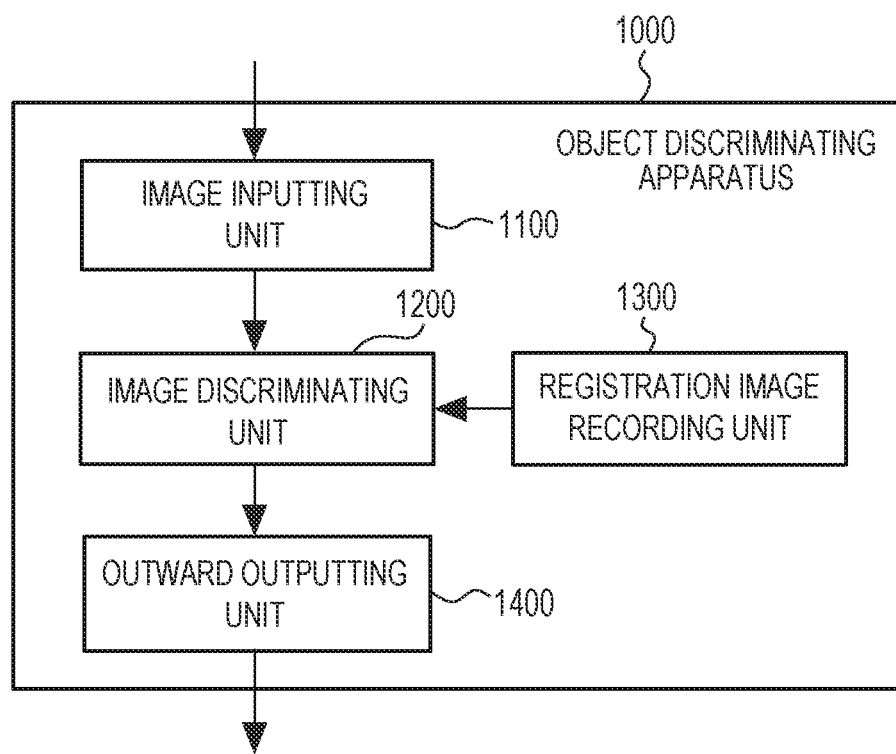
FIG. 2 is a block diagram illustrating an example of the function constitution of an object discriminating apparatus.

FIG. 2 is a block diagram illustrating an example of the function constitution of an object discriminating apparatus 1000 in the present embodiment. The object discriminating apparatus 1000 includes an image inputting unit 1100 for inputting images, an image discriminating unit 1200 for discriminating the category of an object in the image, a registration image recording unit 1300 for holding registration images and an outward outputting unit 1400 for outputting a discriminated result of the object and an attribute determined result. The object discriminating apparatus 1000 is an example of an image processing apparatus. The object discriminating apparatus 1000 has a single processor such as a CPU (central processing unit) or the like, and the function of each of the function constitution components may be performed by the above processor. In addition, in the object discriminating apparatus 1000, each of the function constitution components independently has the processor such as the CPU or the like and the process of each of the function constitution components may be performed by the processor of each of the function constitution components. In a case that the object discriminating apparatus 1000 has the single processor, it will be operated as follows. That is, the function of the object discriminating apparatus 1000 to be described later and processes in the flow chart to be described later are realized by a process that the above processor executes programs stored in a storing unit of the object discriminating apparatus 1000.

The image inputting unit 1100, which is such a device of supplying image data to be discriminated, includes an imaging device having an optical lens and a video image sensor, a semiconductor memory, in which image data is stored, capable of reading out the image data, or the like. In addition, the image inputting unit 1100 successively supplies the image data to be discriminated to the image discriminating unit 1200.

The registration image recording unit 1300 records the image data supplied from the image inputting unit 1100 and records the dictionary which records and holds the image of a person to be discriminated. In the following, a face image of the person to be discriminated held in the registration image recording unit 1300 is merely assumed to be the registration image. The registration image recording unit 1300 classifies the registration images, which are held, for each of the persons and holds them respectively as the same category. The registration image recording unit 1300 records attribute information which indicates the variation condition (photographing condition) such as the face directions corresponding to the respective registration images, the illumination condition or the like. The registration image recording unit 1300 is composed of a semiconductor memory, which can repeatedly rewrite data, or the like. It is desirable that the registration image recording unit 1300 has a storing device having the sufficiently large capacity in order to hold image data of several tens of sheets or more.

The image discriminating unit 1200 outputs the result that the face image received from the image inputting unit 1100 is belonged to what category, that is, the face image is belonged to what person among the persons previously registered in the registration image recording unit 1300. The details of processes to be performed in the image discriminating unit 1200 will be described later in FIG. 3 and the like. The image discriminating unit 1200 is composed of a dedicated circuit (ASIC (application specific integrated circuit)) or a processor (reconfigurable processor, DSP (digital signal processor), CPU or the like), or the like. The process to be performed in the image discriminating unit 1200 also may be realized by a manner that the program is executed by the inner part of the single dedicated circuit or a general-purpose circuit (CPU for a PC (personal computer)).

The outward outputting unit 1400 outputs the data which was output from the image discriminating unit 1200, that is, outputs the category of the input image which was output from the image inputting unit 1100 with an appropriate format. The outward outputting unit 1400, which is constituted by a monitor such as a CRT (cathode-ray tube), a TFT (thin film transistor) liquid crystal display or the like, displays the image data received from the image inputting unit 1100. In addition, the outward outputting unit 1400 displays the data which was output from the image discriminating unit 1200 by superimposing it on the currently displayed image data. In addition, the outward outputting unit 1400, which has an outputting function of outputting the data to an external storing device, may store the output data in an external storage medium or the like as electronic data. In addition, the outward outputting unit 1400, which has a printing function, may print the output data on the paper medium.

Incidentally, an outputting method of the outward outputting unit 1400 is not limited to the above method, and the outward outputting unit 1400 also may transmit the output data to the set address by the E-mail. Further, the outward outputting unit 1400 may output the output data by plural methods.

(Discrimination Flow)

Figure 3:
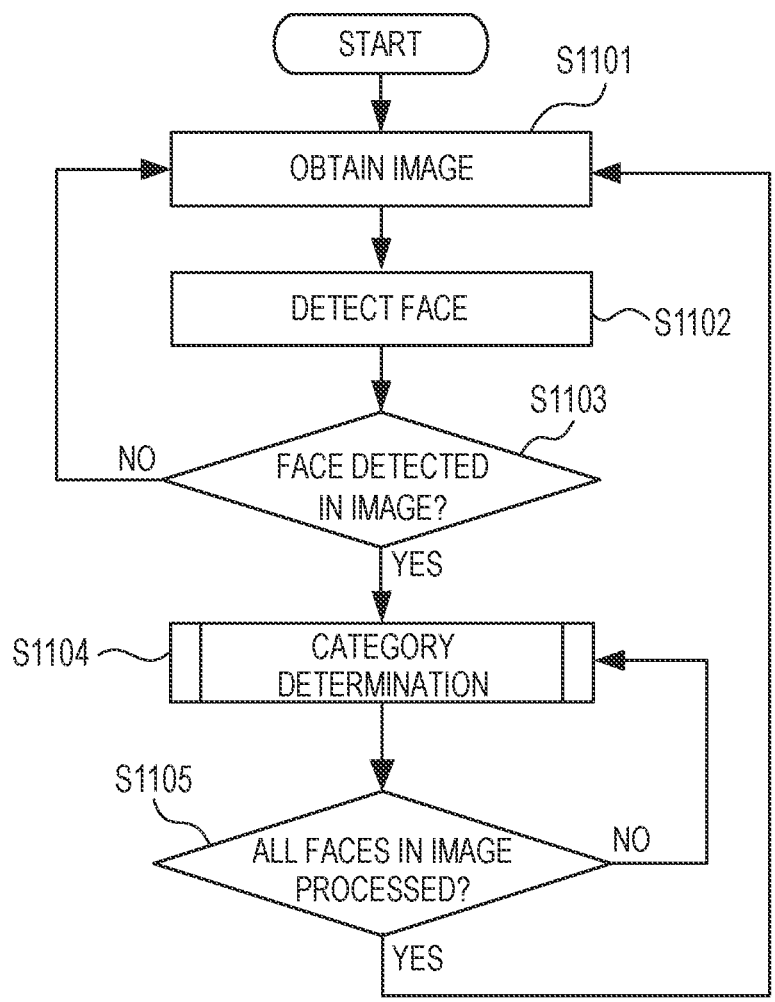
FIG. 3 is a flow chart indicating an example of a face image discriminating process.

FIG. 3 is a flow chart indicating an example of a face image discriminating process to be performed by the object discriminating apparatus 1000. An actual process, in which the object discriminating apparatus 1000 discriminates the face image, will be described with reference to FIG. 3.

In S1101, the image inputting unit 1100 obtains the input image to be processed. In S1102, the image inputting unit 1100 performs a face detecting process to the input image which was obtained in S1101.

In S1103, the image inputting unit 1100 determines whether or not the face can be detected in S1102. When the image inputting unit 1100 determined that the face could be detected in S1102, the flow advances to the process in S1104, and when the image inputting unit 1100 determined that the face could not be detected in S1102, the flow advances to the process in S1101 and the next input image is obtained.

In S1104, the image discriminating unit 1200 performs a process of detecting a category of the face, that is, the person by treating the input image, in which the face was detected in S1102, as the input. In a category determining process, the image discriminating unit 1200 calculates the similarity, which indicates that how a person related to the face detected in the input image seems to be the same person, for each of the registration images. The image discriminating unit 1200 compares the similarities, which were calculated for the respective registration images, with each other, and a category of the registration image which corresponds to the highest similarity is determined as a category of the face in the input image. The details of the process to be performed in S1104 will be described later in FIG. 4 and the like.

In S1105, the image discriminating unit 1200 determines whether or not the processes were performed for all the faces in the input image. When the image discriminating unit 1200 determined that the processes were performed for all the faces in the input image, the flow advances to the process in S1101. When the image discriminating unit 1200 determined that the processes were not performed for all the faces in the input image, the flow advances to the process in S1104, and the next face-category determining process is performed. The object discriminating apparatus 1000 performs a series of processes indicated in FIG. 3 in real time and also can output a category determined result in real time via the outward outputting unit 1400. The "real time" means that the process is completed within a set period so as not to make a user feel the delay. In FIG. 3, the completion of a series of the processes is not written. However, the object discriminating apparatus 1000 may be able to stop or temporarily stop the processes on the basis of an operation performed by a user via a user interface of the object discriminating apparatus 1000.

Figure 4:
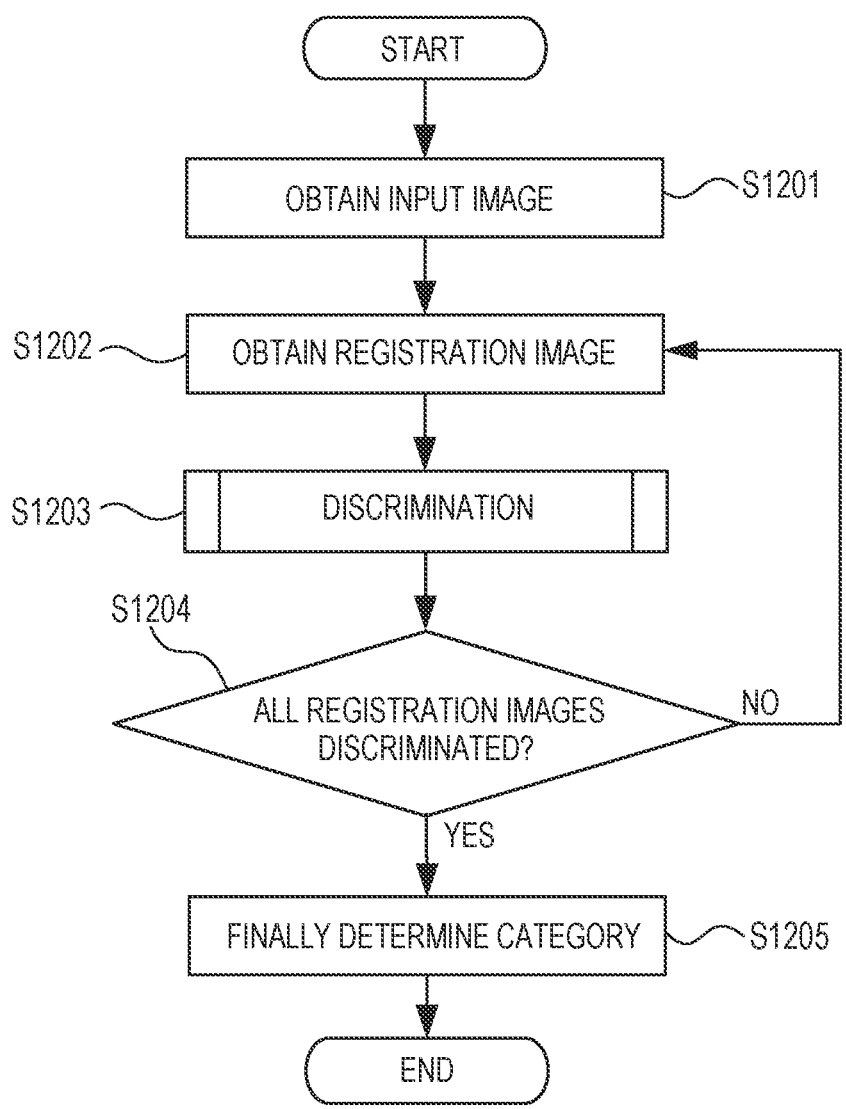
FIG. 4 is a flow chart indicating an example of a category determining process.

FIG. 4 is a flow chart indicating an example of a category determining process. FIG. 4 indicates the details of a process to be performed in S1104 of FIG. 3. A process that the object discriminating apparatus 1000 determines a category of the input image will be described with reference to FIG. 4.

In S1201, the image discriminating unit 1200 receives the input image, in which the face was detected, from the image inputting unit 1100. The above input image is a still image, in which only one face of the person is assumed to be photographed.

In S1202, the image discriminating unit 1200 obtains the one face image, which was previously held in the registration image recording unit 1300, as the registration image.

In S1203, the image discriminating unit 1200 discriminates the input image obtained in S1201 and the registration image obtained in S1202 and calculates the similarity which indicates probability whether or not the person included in the input image is identical with the person included in the registration image. The details of the process to be performed in S1203 will be described later in FIG. 6 and the like.

In S1204, the image discriminating unit 1200 determines whether or not the discriminating processes between the input images and the registration images are performed for all the registration images held in the registration image recording unit 1300. When the image discriminating unit 1200 determined that the discriminating processes between the input images and the registration images were performed for all the registration images held in the registration image recording unit 1300, the flow advances to the process in S1205 by treating that similarities between the input images and the registration images were obtained for all the registration images. When the image discriminating unit 1200 determined that the discriminating processes between the input images and the registration images were not performed for all the registration images held in the registration image recording unit 1300, the flow advances to the process in S1202.

In S1205, the image discriminating unit 1200 compares the largest similarity among similarities calculated in S1203 with the set threshold and determines the final category of the input image on the basis of the compared result. When the above largest similarity is equal to or larger than the above threshold, the image discriminating unit 1200 determines that the category of the input image is such a category to which the registration image corresponding to the above largest similarity is belonged. When the largest similarity is less than the above threshold, the image discriminating unit 1200 determines that the category, to which the input image is belonged, does not exist. The above threshold is assumed to be stored in the storing device or the like of the object discriminating apparatus 1000 in a form of a setting file or the like. The object discriminating apparatus 1000 can change a value of the above threshold stored in the above setting file or the like on the basis of an operation performed by the user via the user interface of the object discriminating apparatus 1000. The above threshold is assumed to be previously adjusted in accordance with the purpose. When the threshold becomes a lower value, the possibility capable of recognizing the registered person more increases. However, the possibility of erroneously determining that a person who is not registered is any one of the registered persons also increases. Conversely, when the threshold becomes a higher value, the possibility of erroneously recognizing the person who is not registered more decreases. However, the possibility incapable of recognizing the registered person increases.

(Outline of Discriminating Process)

Figure 5:
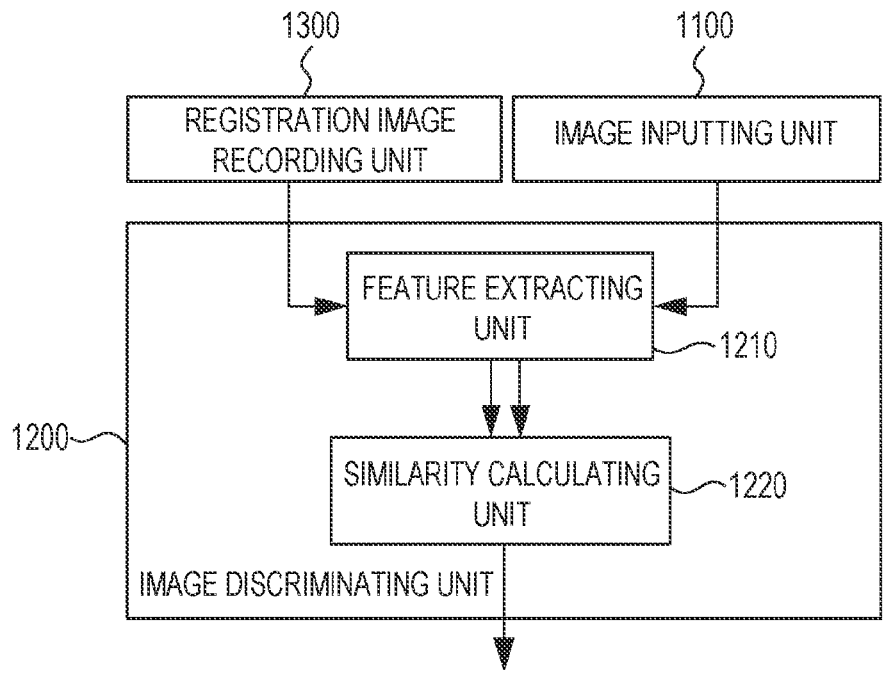
Figure 6:
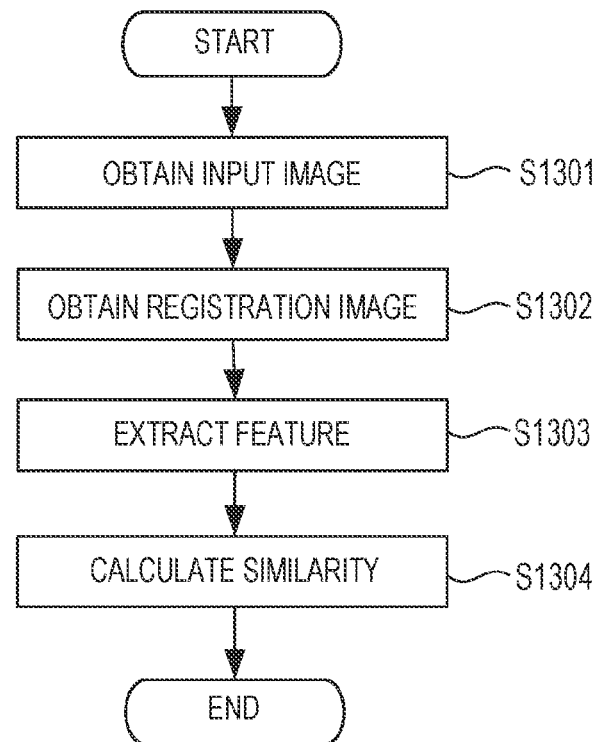
FIG. 6 is a flow chart indicating an example of a discriminating process.

FIG. 5 is a block diagram illustrating an example of the function constitutions of the image discriminating unit 1200 and the like. FIG. 6 is a flow chart indicating an example of the discriminating process to be performed in S1203. An outline of the discriminating process to be performed in S1203 of FIG. 4 will be described with reference to FIG. 5 and FIG. 6.

The image discriminating unit 1200 includes a feature extracting unit 1210 and a similarity calculating unit 1220. The feature extracting unit 1210 extracts the feature amount from the input image and the registration image. The similarity calculating unit 1220 calculates the similarity between the input image and the registration image on the basis of the feature amounts extracted from the input image and the registration image by the feature extracting unit 1210.

In S1301, the feature extracting unit 1210 obtains the input image which was obtained in S1201. It is assumed that the input image, which is identical with the input image in the process indicated in FIG. 4, is such an image of including one face.

In S1302, the feature extracting unit 1210 obtains the registration image, which is to be discriminated with the input image, obtained in S1202.

In S1303, the feature extracting unit 1210 extracts the feature amounts respectively from the input image obtained in S1301 and the registration image obtained in S1302.

In S1304, the similarity calculating unit 1220 calculates similarities between the input image and the registration image on the basis of the feature amounts of the input image and the registration image extracted in S1303.

The details of processes to be performed in S1303 and S1304 in FIG. 6 will be described later in sections of "Feature Extracting Process in Discriminating Process" and "Similarity Calculating Process in Discriminating Process". In the category determining process indicated in FIG. 4, it was assumed that the registration image recording unit 1300 holds the registered face image as the registration image. It is desirable that the registration image recording unit 1300 stores the feature amount of the registration image obtained in S1303. Accordingly, since the feature extracting unit 1210 is not required to perform the process of extracting the feature amount of the registration image when the input image is obtained again, the load in performing the process can be reduced.

(Feature Extracting Process in Discriminating Process)

The details of the feature extracting process to be performed in S1303 of FIG. 6 will be described. In S1303, the feature extracting unit 1210 extracts the feature amount, which is required in discriminating the individual, from the input image which includes a person's face. In the present embodiment, the feature extracting unit 1210 extracts the feature amount as described in the following.

First, the feature extracting unit 1210 detects feature points representing positions of the representative facial organs such as the eyes, the nose, the mouth and the like on the input image. The feature extracting unit 1210 uses the known technique as a method of setting the feature points such the technique as described in, for example, "Active Shape Models—Their Training and Application" T. F. Cootes, C. J. Taylor, D. Cooper, and J. Graham: 1995.

Subsequently, the feature extracting unit 1210 performs a normalizing process of the input image. For example, the feature extracting unit 1210 typically performs a rotating process and a magnification/reduction process to the input image on the basis of the detected both-eyes positions such that the width and inclination of the both-eyes become a distance value which was set on the image.

Then, the feature extracting unit 1210 sets a rectangular area used for extracting the feature amount for the normalized input image. Although the feature extracting unit 1210 can arbitrarily set the area size, it is desirable to set a square, of which one side has such the length which is 1.5 times the eye width, in the center of the face such that all organs such as the eyes, the mouth and the like for well representing the individual feature are included in the square area but the background and the like are not included in the square area. Then, the feature extracting unit 1210 extracts pixel values in the set rectangular area sequentially from the upper-left part to the lower-right part. Then, the feature extracting unit 1210 obtains a vector of connecting the extracted pixel values in one line. The feature extracting unit 1210 treats the obtained vector as the feature amount of the image in the above set rectangular area.

(Similarity Calculating Process in Discriminating Process)

The details of the similarity calculating process to be performed in S1304 of FIG. 6 will be described. In S1304, the similarity calculating unit 1220 calculates the similarity between the input image and the registration image on the basis of the feature amount of the input image and the feature amount of the registration image obtained in S1303. Although the similarity calculating unit 1220 may calculate an arbitrary index as the similarity, it is desirable to calculate such an index, which indicates that the feature amounts become similar to each other when the index becomes larger, as the similarity. For example, the similarity calculating unit 1220 may calculate the cosine of an angle formed between vectors of the feature amounts as the similarity or may calculate an inverse number of the Euclidean distance between vectors of the feature amounts as the similarity.

(Outline of Registering Process)

Figure 7:
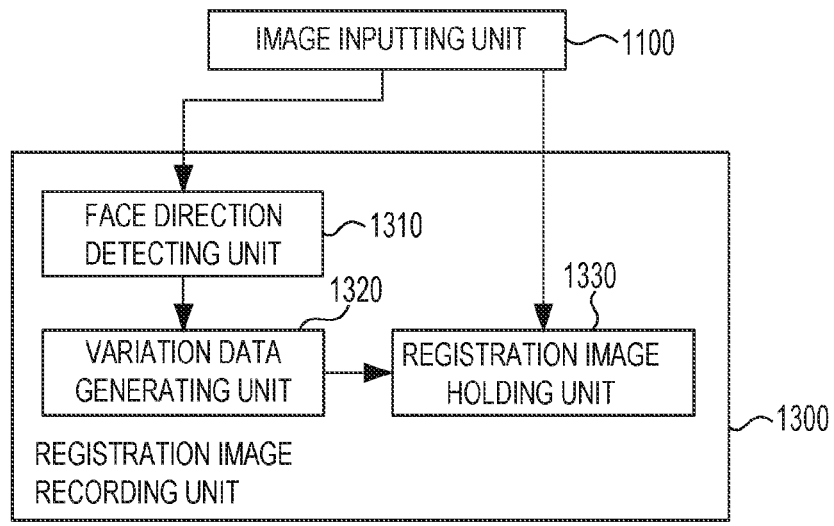

The registering process of the registration image, which is previously performed by the registration image recording unit 1300 before performing the face discriminating process indicated in FIG. 3, will be described. FIG. 7 is a block diagram illustrating an example of the function constitutions of the registration image recording unit 1300 and the like.

The registration image recording unit 1300 includes a face direction detecting unit 1310 for detecting the face direction in the image, a variation data generating unit 1320 for generating a new face image and a registration image holding unit 1330 for holding the registration image.

The registration image holding unit 1330 stores the input image to be used for the registration, which includes a person's face received from the image inputting unit 1100, and attribute information (photographing condition) corresponding to the above input image to be used for the registration. The input image to be used for the registration, which includes a person's face, is an example of the input face image. Then, the variation data generating unit 1320 generates the new face image having another face direction from the received input image to be used for the registration. The registration image holding unit 1330 stores the face image generated by the variation data generating unit 1320 as the image, which has the same category (the same person) as that of the input image for the registration. The details of the process to be performed in the variation data generating unit 1320 will be described later in FIG. 8, FIG. 9 and the like.

The registration image recording unit 1300 generates the registration image having plural different attribute information (face direction and the like) from the input image to be used for the registration and stores the generated registration image. Thereby, even if an image having the any face direction is input as the input image to be discriminated, at least the one registration image having the face-direction variation, which is the same as that of the input image, (having the same attribute information) is to be registered in the registration image recording unit 1300. Therefore, the image discriminating unit 1200 can calculate the similarity between the input image and the registration image of which the attribute is the same as that of the input image, and the determination of category can be accurately performed. The registration image recording unit 1300 decides that how many images of having what kind of the face directions are to be generated on the basis of the capacity of the registration image holding unit 1330, a period taken in discriminating a pair of face images and the like. It is desirable that the registration image recording unit 1300 generates the plural face images having the variations of varying the face directions at an interval from an angle of 10 degrees to 15 degrees and stores the generated face images.

(Variation Data Generating Process in Registering Process)

Figure 8:
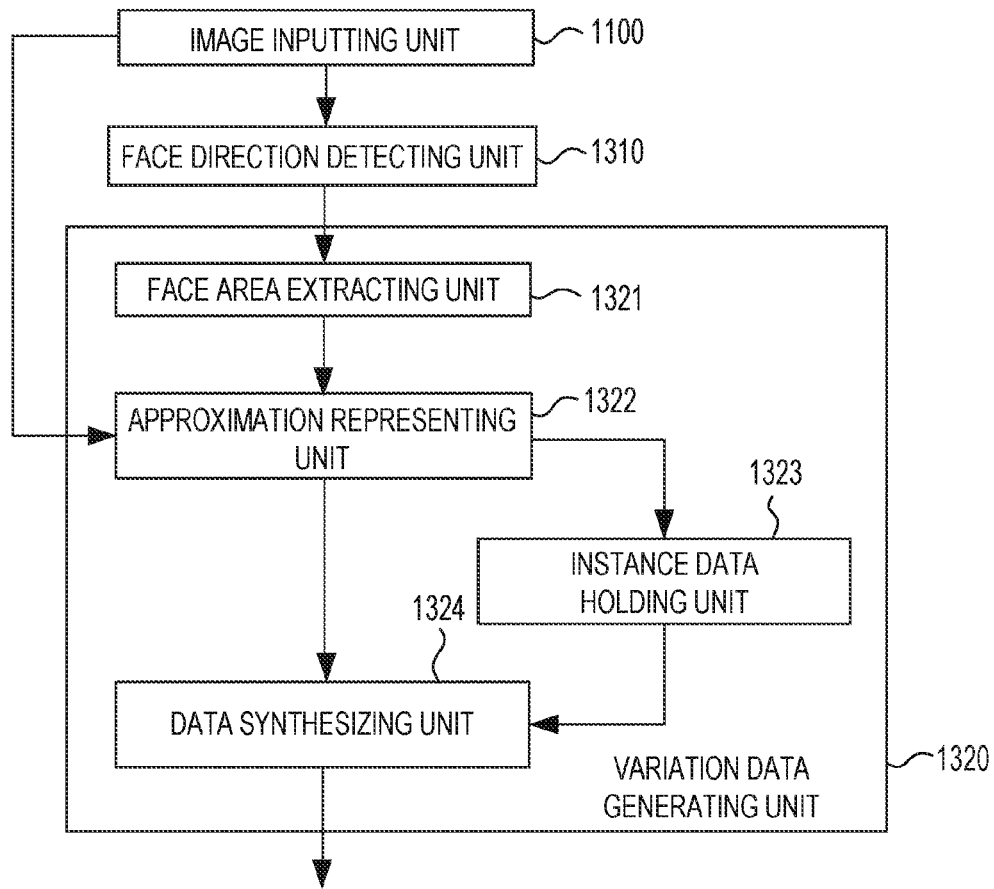
Figure 9:
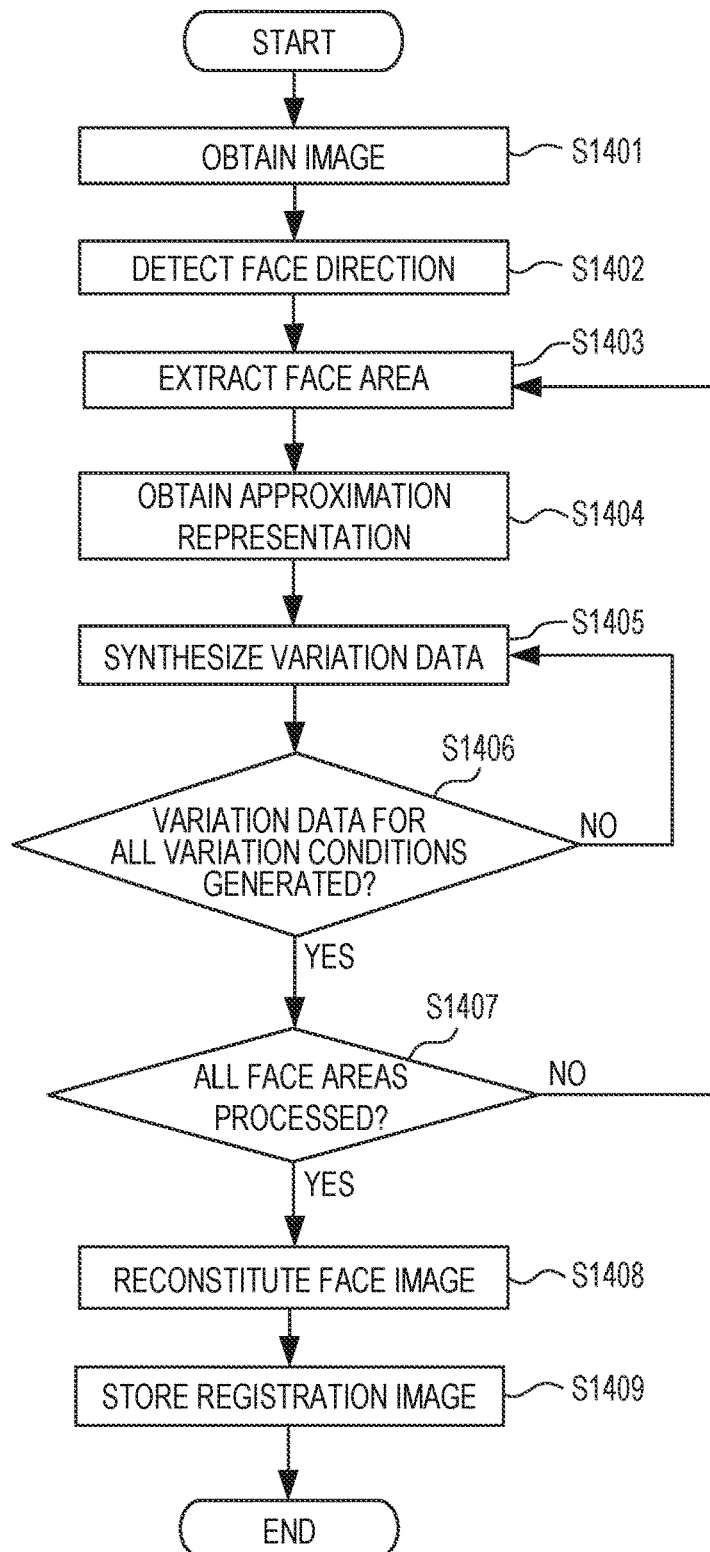
FIG. 9 is a flow chart indicating an example of a variation data generating process.
Figure 10:
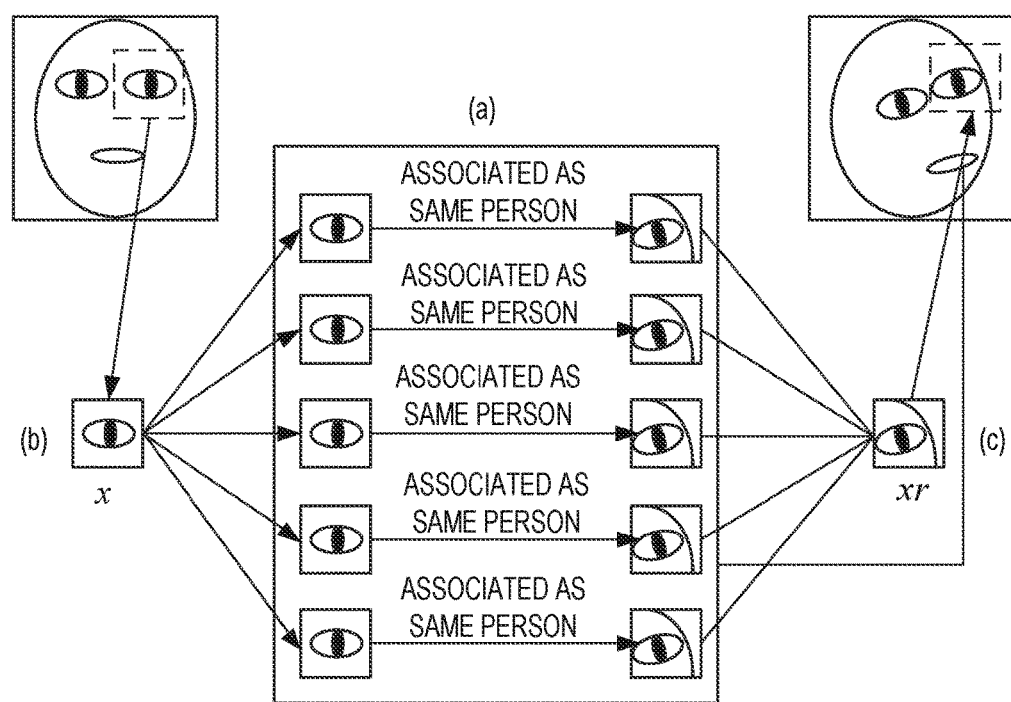
FIG. 10 is a diagram for describing the example of the variation data generating process.

FIG. 8 is a block diagram illustrating an example of the function constitutions of the variation data generating unit 1320 and the like. FIG. 9 is a flow chart indicating an example of the variation data generating process. FIG. 10 is a diagram for describing an example of the variation data generating process. The details of a process for generating the new face image having another face direction will be described with reference to FIG. 8, FIG. 9 and FIG. 10. In the present embodiment, it is assumed that the variation data generating unit 1320 performs a process of generating an image related to an eye area under the condition that the face turns to the right seen from the front side as a generating process of the variation data.

The variation data generating unit 1320 includes a face area extracting unit 1321 for extracting a face area in the image, an approximation representing unit 1322 for obtaining a linear combination of instance (or case example) data in order to approximate the input image and an instance data holding unit 1323 for fording the instance data. In addition, the variation data generating unit 1320 includes a data synthesizing unit 1324 for synthesizing an entire face image from partial area images of the face.

In S1401, the face direction detecting unit 1310 receives the input image to be used for the registration from the image inputting unit 1100. It is assumed that the input image to be used for the registration is such an image which includes a frontal face.

In S1402, the face direction detecting unit 1310 detects the face direction of the face included in the input image to be used for the registration obtained in S1401. In the present embodiment, the face direction detecting unit 1310 detects that the face direction of the face included in the input image to be used for the registration is the frontal direction. As a method of detecting the face direction, for example, the technique described in "Support vector machine based multi-view face detection and recognition" Y. Li, S. Gong, J. Sherrah, and H. Liddell: 2004 can be used.

In S1403, the face area extracting unit 1321 extracts partial areas such as the eyes, the nose, the mouth and the like from the input image to be used for the registration. As a method of extracting the partial area, there is such a method of extracting the area on the basis of a feature point which was set on the face image as mentioned in the description of the feature extracting unit 1210 indicated in FIG. 6. In the present embodiment, it is assumed that the face area extracting unit 1321 extracts a partial area of the eye from the input image to be used for the registration, and the extracted image is assumed as a partial area image x.

The instance data holding unit 1323 holds partial area images of the eyes for N persons extracted from the registration image, which includes frontal faces, held in the registration image holding unit 1330, and the partial area images being held are treated as the instance images of the frontal faces. The instance images of the frontal faces for N persons are expressed by F=[f1, f2, f3, . . . , fN]. The fn (n is a natural number satisfying the relation of 1≤n≤N) indicates each one of the instance images of the frontal faces. The F is expressed as a vector obtained by arranging the respective instance images of the frontal faces.

The instance data holding unit 1323 holds the partial area images of the eyes for N persons extracted from the registration image which includes the turning-right faces held in the registration image holding unit 1330 by associating them with the respective same persons of the instance images of the frontal faces, and the partial area images being held are treated as the instance images of the turning-right faces. Further, it is assumed that the instance images of the frontal faces are previously associated with the instance images of the turning-right faces between the same persons. The instance images of the turning-right faces for N persons are expressed by R=[r1, r2, r3, . . . , rN]. The rn (n is a natural number satisfying the relation of 1≤n≤N) indicates each one of the instance images of the turning-right faces. The R is expressed as a vector obtained by arranging the respective instance images of the turning-right faces.

A symbol (a) in FIG. 10 indicates the relation between the instance image of the frontal face and the instance image of the turning-right face. It is assumed that the instance data holding unit 1323 adjusts the number N of the instance images according to a race, sex, the age range of a person given as the registration image. It is desirable that the instance data holding unit 1323 sets the number N of the instance images to become hundreds as indicated in the above literature by Yin. In S1404, the approximation representing unit 1322 obtains the instance image, which corresponds to a part of the eye of the frontal face of which the direction is the same as that in the partial area image x extracted in S1403, from the instance data holding unit 1323. The approximation representing unit 1322 extracts the instance image having attribute information, which indicates that the face direction is the frontal direction, from among the instance images corresponding to parts of the eyes of the faces held in the instance data holding unit 1323. Then, the approximation representing unit 1322 approximately reproduces the partial area image x by linearly combining at least one or more images from among the instance images. More specifically, the approximation representing unit 1322 obtains an N-dimensional linear combination coefficient vector α most suitably satisfying the following expression (1).

$$\alpha = [a_1, a_2, a_3 \ldots a_N]^T \quad (1)$$

$$\operatorname*{argmin}_{\alpha \in R^N} \left( \|x - F\alpha\|_2 + \lambda \sum_{n=1}^{N} |\alpha_n| \right) \lambda \geq 0$$

The above expression (1) is a restriction expression which minimizes the L2 norm for representing the error (difference) between the sum of the absolute values of weights of the instance images to be linearly coupled and the partial area image x expressed by the following expression (3) while reducing the sum of the absolute values of weights of the instance images to be linearly coupled expressed by the following expression (2) as small as possible.

$$\sum_{n=1}^{N} |\alpha_n| \quad (2)$$

$$\|x - F\alpha\|_2 \quad (3)$$

As a numerical value processing method of solving the above α, for example, there is a method described in "Regression shrinkage and selection via the lasso" R. Tibshiran: 1996.

As for the a obtained by using the above-described method, most elements become zero vectors and become coarse linear combination coefficient vectors for linearly combining only a part of the instance images.

In addition, the approximation representing unit 1322 may obtain an N-dimensional linear combination coefficient vector α most suitably satisfying the following expression (4).

$$\arg\min_{\alpha \in R^N} \left( \|x - F\alpha\|_2 + \lambda \sum_{n=1}^{N} (|\alpha_n| \times \|x - f_n\|_2) \right) \quad (4)$$

The above expression (4) added such the restriction, which performs the linear combination by giving a large weight to the instance image which is similar to the input, that is, the instance image of which the L2 norm from the input is small, to the expression (1) as the additional restriction as indicated by the expression (5).

$$\sum_{n=1}^{N} (|\alpha_n| \times \|x - f_n\|_2) \quad (5)$$

The λ in the expression (1) and the expression (4), which is a constant number, is assumed to be previously adjusted before the registering process of the image. A symbol (b) in FIG. 10 indicates a process to be performed in S1404.

In S1405, as a next stage of the generating process, the data synthesizing unit 1324 synthesizes a partial area image xr of the turning-right face by linearly combining the instance images of the turning-right faces by using the linear combination coefficient vector α obtained in S1404. The expression in order to synthesize the partial area image xr becomes the following expression (6). A symbol (c) in FIG. 10 indicates a process to be performed in S1405.

$$R = [r_1, r_2 \ldots r_N]$$

$$xr = R\alpha \quad (6)$$

In S1406, the variation data generating unit 1320 determines whether or not variation data is generated for all the variation conditions in S1405. When the variation data generating unit 1320 determined that the variation data was generated for all the variation conditions in S1405, the flow advances to the process in S1407. When the variation data generating unit 1320 determined that the variation data was not generated for all the variation conditions in S1405, the flow returns to the process in S1405.

In S1407, the variation data generating unit 1320 determines whether or not the processes in S1404 to S1406 are completed for all of the partial areas of the eyes, the nose, the mouth and the like in the input image to be used for the registration. When the variation data generating unit 1320 determined that the processes in S1404 to S1406 were completed for all of the partial areas of the eyes, the nose, the mouth and the like in the input image to be used for the registration, the flow advances to the process in S1408. When the variation data generating unit 1320 determined that the processes in S1404 to S1406 were not completed for all of the partial areas of the eyes, the nose, the mouth and the like in the input image to be used for the registration, the flow advances to the process in S1403.

In S1408, as the last stage of the generating process, the data synthesizing unit 1324 reconstitutes the images for partial areas of the eyes, the nose, the mouth and the like obtained by performing the synthesis in S1405 as the entire face image. The data synthesizing unit 1324 performs the reconstitution by such a method of joining the obtained images of partial areas synthesized in S1405 together on the basis of coordinates of the feature points of the face obtained in S1403. In S1409, the variation data generating unit 1320 stores the entire face image, which was reconstituted in S1408, together with the attribute information, which indicates that the face direction is the right direction, in the registration image holding unit 1330.

The process to be performed in S1404 will be additionally described. In the present embodiment, although the feature amount of the image targeted to be processed is represented as the vector obtained by arranging pixel values in the image from an upper-left part to a lower-right part, the dimension of the above vector becomes the same as that of the pixel number of the image, and the dimension number becomes the large number in accordance with the image size, therefore, there is a risk that the processing load also becomes the large load. Therefore, the object discriminating apparatus 1000 may linearly converts the vector of the image targeted to be processed to the low-dimensional vector of which the dimension is lower than that of the original vector by the linear projection base which was previously obtained by the PCA (Principal Component Analysis) or the like. In that case, the feature amount of the image targeted to be processed of the present embodiment is to be represented as the low-dimensional vector which was linearly converted. The approximation representing unit 1322 can reduce the calculating load in the process to be performed in S1404 by the process that both the partial area image x and the instance image F of the frontal face are linearly converted to the low-dimensional vector. The above content is the description of the processes to be performed in the present embodiment.

(Effect by Processes of the Present Embodiment)

According to the processes of the present embodiment, the object discriminating apparatus 1000 can generate an image, in which a person's face is similar to the input face, even when the image, in which the person's face is sufficiently similar to the face which was input to the instance image, is not included. The object discriminating apparatus 1000 of the present embodiment can sufficiently represent the input even in the case of a little number of the instance images by restricting that the input is to be represented by combining the plural instance images.

In the present embodiment, the object discriminating apparatus 1000 is to utilize a useful assumption about the face utilized in the conventional technique. As for the useful assumption about the face, there are following two assumptions.

The first assumption is that a human face has infinite variations, which are different individually. However, when the face is taken apart into parts such as the eyes, the nose, the mouth and the like, there are only a few variations as compared with the entire face.

The second assumption is that when the face parts of another two persons are similar to each other on the appearance under a certain photographing condition, the face parts of another two persons are also similar to each other on the appearance even under the different photographing condition. The manner of change of the appearance of the face when the photographing condition is varied, for example, the manner of change of the appearance of the face when the face direction is varied depends on the three-dimensional shape of the face. The correlation at a certain level exists between the appearance of the face on a plane when the face is seen as the image and the three-dimensional shape including a depth of the face. Therefore, when the parts of the two faces are similar to each other on the appearance under a certain photographing condition, the three-dimensional shapes of the faces, which are implicitly involved, are also similar to each other, and, for example, it can be assumed that the manner of change of the appearance of the face when the face direction is varied is also similar.

In other words, the second assumption is as follows. That is, three dimensional shape of the face is implicitly predicted from the appearance on the image of the face. It follows that the appearance of the face under the different photographing condition is predicted from the three-dimensional shape of the face in the above predicted photographing condition.

In S1404 of the present embodiment, the approximation representing unit 1322 obtains such the approximation representation of reducing the error between the input and an approximate value to become a small error in the expression (1) by linearly combining the plural instance images. However, such a restriction of utilizing the above second assumption is not included in the expression (1). Therefore, since the approximation representing unit 1322 also linearly couples the instance images which are not similar to the input, there is such the possibility of generating a broken image without correctly predicting the three-dimensional shape of the input.

The approximation representing unit 1322 correctly predicts the three-dimensional shape of the input by restricting so as to perform the linear combination by giving a large weight to the instance image similar to the input by using the expression (2), and the input can be approximately represented accurately as compared with the conventional technique.

Second Embodiment

In the first embodiment, the process of previously generating the variation-added image from the registration image has been described by exemplifying a case of generating the variation due to the face directions. On the other hand, in the present embodiment, the registration image and the image targeted to be discriminated are respectively processed, and it will be described about the process of determining the category by generating the images of the frontal faces regarding the above both images. The details of the function constitution of the object discriminating apparatus 1000 are similar to those in the first embodiment excepting the details of the registration image recording unit.

(Outline of Registering Process)

Figure 11:
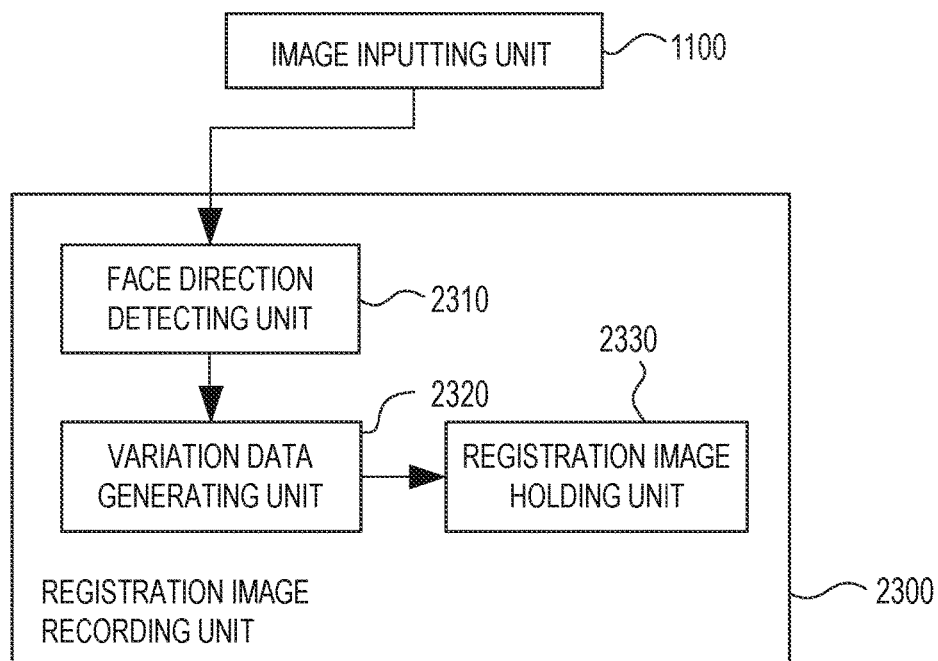

A process of previously registering the face image in the present embodiment will be described. FIG. 11 is a block diagram illustrating an example of the function constitutions of a registration image recording unit 2300 and the like. The registration image recording unit 2300 includes a face direction detecting unit 2310, a variation data generating unit 2320 and a registration image holding unit 2330. The details of the face direction detecting unit 2310 and the variation data generating unit 2320 are respectively similar to those of the face direction detecting unit 1310 and the variation data generating unit 1320 in the first embodiment The difference between the registration image recording unit 2300 and the registration image recording unit 1300 of the first embodiment is the following point. That is, the registration image holding unit 2330 does not directly store the face image received from the image inputting unit 1100 as the registration image but stores only the one face image obtained by converting the above face image into the image of the frontal face together with attribute information indicating that the face direction is the frontal direction.

(Discriminating Process)

FIG. 12 is a flow chart indicating an example of a category determining process. The process in FIG. 12 of the present embodiment is such a process which corresponds to the category determining process in FIG. 4 in the first embodiment. It will be described about the process that the object discriminating apparatus 1000 in the present embodiment determines the category of the input image with reference to FIG. 12. The processes to be performed in S1202 to S1205 are the same as those in FIG. 4.

In S2101, the image discriminating unit 1200 receives the input image, in which the face was detected, from the image inputting unit 1100.

In S2102, the image discriminating unit 1200 converts the input image which was obtained in S2101 and generates only the one face image of which the face direction becomes the frontal direction.

In the discriminating process of the first embodiment, the registration image recording unit 1300 registers the plural registration images having various face directions as the registration images. Therefore, at least one image among the registration images registered in the registration image recording unit 1300 is discriminated under the condition that the variation due to the face directions is not found between that one image and the input image targeted to be discriminated.

On the other hand, the object discriminating apparatus 1000 can discriminate the registration image and the input image under the condition that the variation due to the face directions is not found between them by converting both the registration image registered in the registration image recording unit 2300 and the input image targeted to be discriminated to the frontal face images.

(Effect According to Process of the Present Embodiment)

According to the process of the present embodiment, the number of the registration images required to calculate the similarity between the input image and the registration image becomes one for the one category, and this number becomes a small number as compared with a case of the first embodiment, where it is required to calculate the similarities between the plural registration images and the input image for the one category. Therefore, the object discriminating apparatus 1000 can reduce the load in the process of calculating the similarity between the input image and the registration image in the discriminating process.

In the first embodiment, although the number of times of the processes of calculating the similarities increases in the object discriminating apparatus 1000 as compared with the case of the present embodiment, there is such an advantage of not requiring to perform the variation data generating process when registering the registration image and when inputting the input image.

The object discriminating apparatus 1000 can select the process of the first embodiment or the process of the present embodiment in accordance with the using situation.

Third Embodiment

In the first and second embodiments, it has been described by exemplifying the variation due to the face directions as the variation of the image. In the present embodiment, the process to be performed in the object discriminating apparatus 1000 will be described by exemplifying the illumination variation as the variation of the image. The illumination variation of the face is the image variation due to a state of appearing the shade on the face by the change of the illumination condition of illuminating the face. The state of appearing the shade on the face is such the variation which depends on the three dimensional shape of the face similar to a case of the face direction. Therefore, the object discriminating apparatus 1000 can generate the variation image, to which the illumination variation is added, by a process which is similar to the process described in the first embodiment.

Figure 13A:
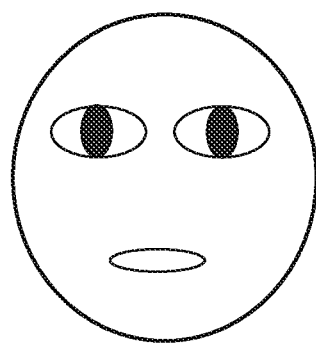
FIGS. 13A and 13B are diagrams illustrating an example of a variation due to illumination.
Figure 13B:
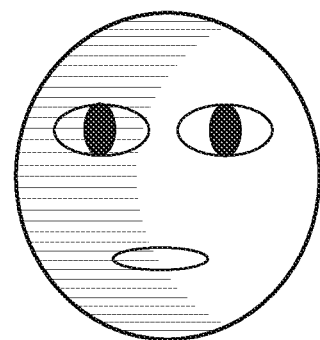

FIGS. 13A and 13B are diagrams illustrating an example of the variation due to the illumination. FIG. 13A illustrates the frontal face illuminated from the front side. FIG. 13B illustrates the frontal face of the same person illustrated in FIG. 13A illuminated from the right side seen from the near side. In the present embodiment, it will be described about a process that the face image under the condition of illuminated from the right side is generated from the face image under the condition of illuminated from the front side of the face.

The details of the function constitution of the object discriminating apparatus 1000 in the present embodiment are the same as those in the first embodiment excepting a fact that an illumination detecting unit 3310 is included and the details of the variation data generating unit.

(Variation Data Generating Process in Registering Process)

Figure 14:
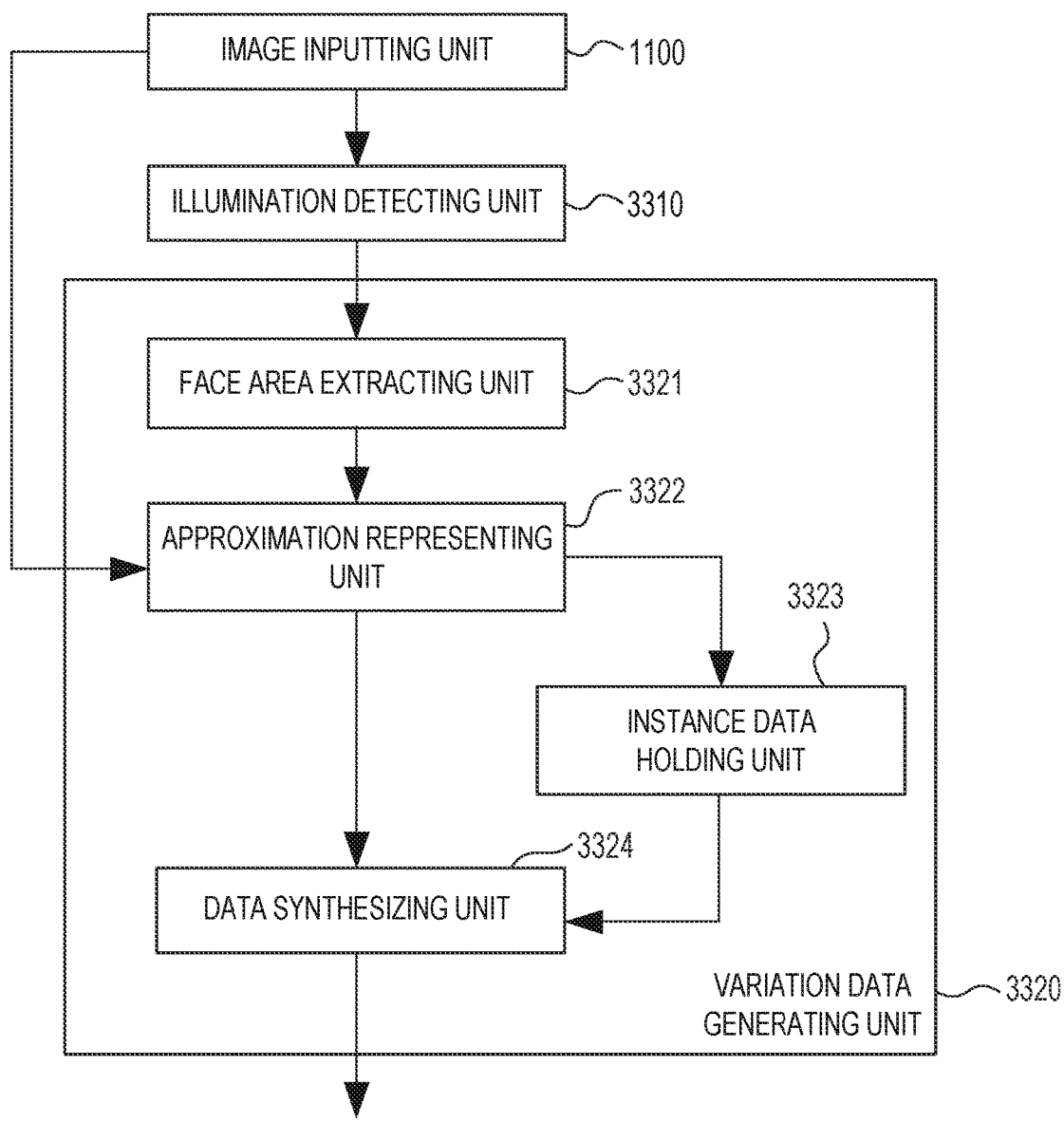

FIG. 14 is a block diagram illustrating an example of the function constitutions of a variation data generating unit 3320 and the like. In the present embodiment, the object discriminating apparatus 1000 includes the illumination detecting unit 3310, which detects the illumination condition of the face, different from the case of the first embodiment. In addition, an instance data holding unit 3323 includes the instance image under the condition of illuminated from the front side and the instance image under the condition of illuminated from the right side.

The process to be performed in the illumination detecting unit 3310 will be described. The illumination detecting unit 3310 determines whether the light source exists at the left side or the right side of the face for the one face included in the input image as the illumination condition. A method of determining the illumination condition in the present embodiment will be described in the following.

First, the illumination detecting unit 3310 normalizes the face area of the input image. More specifically, the illumination detecting unit 3310 extracts a partial image area, where only the face is included, from the input image on the basis of the face position and size obtained by the face detecting process. The illumination detecting unit 3310 extracts the partial image area such that the size or the inclination of the face included in the image is made to be nearly constant for any kind of the face.

Next, the illumination detecting unit 3310 reduces the size of the extracted partial image by a bi-linear method or the like and obtains a low-resolution partial image. Although it is impossible for the illumination detecting unit 3310 to determine an individual person in a state that the facial features are disappeared, it is desirable to obtain such the partial image, in which the overall light and shade or shadow of the face is slightly remained.

The illumination detecting unit 3310 treats the line, which was obtained by sequentially arranging respective pixel values of the obtained low-resolution partial image from an upper-left part to a lower-right part, as a vector and calculates an inner product of this vector and a base vector which was previously obtained. The illumination detecting unit 3310 finally determines that the light source which illuminates the face exists in what position according to a fact whether the obtained inner product value is positive or negative.

As a method of previously obtaining the base vector, there is a known method such as the linear discriminant analysis or the like. The object discriminating apparatus 1000 can obtain the one base vector as a boundary most capable of discriminating the partial image under the two illumination conditions by previously preparing a large number of the reduced partial images under the condition that the light source exists on the left side and a large number of the reduced partial images under the condition that the light source exists on the front side. In the above-described method, it is assumed that the face looks toward a specific direction, particularly, in the present embodiment, the face looks toward the front side.

As above, a method of determining the illumination condition in the present embodiment has been described. However, a determining method of the illumination condition is not limited to the above-described method, and the object discriminating apparatus 1000 may determine the illumination condition from the face by utilizing an arbitrary method such as a method described in, for example, "Illumination Cones for Recognition Under Variable Lighting" A. S. Georghiades, D. J. Kriegman, P. N. Belhumeur: 1998.

(Effect of Process of the Present Embodiment)

According to the process of the present embodiment, the object discriminating apparatus 1000 generates variation data different in the illumination condition, and the generated data can be utilized in the discriminating process and the registering process.

Fourth Embodiment

In the first to third embodiments, it has been described by exemplifying the variation due to the face directions and the illumination variation as the variation of the image. In the first to third embodiments, it was assumed that the object discriminating apparatus 1000 generates a variation image, to which the one variation is added among the variations such as the variation due to the face directions, the illumination variation and the like. However, the object discriminating apparatus 1000 can also generate a variation image, to which the plural variations such as the variation due to the face directions, the illumination variation and the like are complexly added. In this case, the object discriminating apparatus 1000 only has to store the face images corresponding to the number of conditions, where the variations are complexly added, in the instance data holding unit.

In the first to third embodiments, an example of automatically determining a person's face has been described. However, the object discriminating apparatus 1000 can perform the following process other than the processes described in the first to third embodiments. That is, the object discriminating apparatus 1000 performs only the process of converting the image by a data synthesizing process, and the converted image can be presented to a user. In this case, the user visually discriminates the person on the basis of the presented image.

As an example of the process described in the above, there is a search of a suspect or the like performed from a monitoring camera by the police. As for the video image of the monitoring camera, a field of vision is wide and the resolution of each of faces is at a low level, and there is a case that the visual discrimination of the face becomes a difficult matter. In addition, as for a photograph of suspect's face kept at the police, there is a case of passing a long time from the photographed date, and there is possibility that a secular change must be considered.

The object discriminating apparatus 1000 can cope with the low resolution as described in the following. The object discriminating apparatus 1000 previously holds the low-resolution face images and the high-resolution face images in the instance data holding unit by associating those images with persons. Accordingly, the object discriminating apparatus 1000 can generate variation data having the variation of the resolution by treating the difference of the resolution as the variation of an image. The object discriminating apparatus 1000 can predict the high-resolution face image from the low-resolution face image similar to an example of the variation due to the face directions.

In addition, also as for the secular change, the object discriminating apparatus 1000 can predict a face of a person, whose face was changed due to the secular change, from the face image by a process that the face image photographed at a certain time point and the face image photographed after passing years are held by associating them with each other. Further, also as for the change of a face look, the object discriminating apparatus 1000 can predict a face of the person, whose the face look was changed, from the face images by a process that the face image photographed with a certain face look and the face image photographed with another face look are held by associating them with each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-048766, filed Mar. 11, 2015, which is hereby incorporated by reference herein in its entirety.

What is claimed is:

1. An image processing method comprising:
   storing in advance, as partial instance images in a storing unit, a plurality of partial face images obtained by photographing a face image of each of a plurality of persons on a plurality of photographing conditions and extracting a plurality of specific parts from each photographed face image, while associating each of the specific parts with a corresponding person and a corresponding photographing condition;
   obtaining a photographing condition of an input face image;
   approximating, for each of the specific parts, a specific part of the input face image by a first linear combination of the partial instance images of the specific part stored in the storing unit in association with respective persons and the photographing condition corresponding to the photographing condition of the input face image;
   determining coefficients in the first linear combination so that a difference between the specific part of the input face image and the first linear combination of the partial instance images of the specific part becomes minimized and that a sum of absolute values of the coefficients becomes minimized;
   deciding, for each specific part of the input face image, a second linear combination of the partial instance images of the specific part stored in the storing unit in association with respective persons and each of a plurality of predetermined photographing conditions so that a weight for a partial instance image associated with each person in the second linear combination corresponds to the weight for the partial instance image associated with that person in the first linear combination of that part; and
   generating an approximate image of the input face image with respect to each of the plurality of predetermined photographing conditions, by synthesizing the second linear combinations obtained for the plurality of specific parts of the input face image for each predetermined photographing condition.

2. An image processing apparatus comprising:
   a storing unit which stores in advance, as partial instance images, a plurality of partial face images obtained by photographing a face image of each of a plurality of persons on a plurality of photographing conditions, and extracting a plurality of specific parts from each photographed face image while associating each of the specific parts with a corresponding person and a corresponding photographing condition;

at least one memory storing computer-executable instructions; and at least one processor configured to execute the computer-executable instructions to implement:

an obtaining unit configured to obtain a photographing condition of an input face image;

an approximating unit configured to approximate, for each of the specific parts, a specific part of the input face image by a first linear combination of the partial instance images of the specific part stored in the storing unit in association with respective persons and the photographing condition corresponding to the photographing condition of the input face image; where coefficients in the first linear combination are determined so that a difference between the specific part of the input face image and the first linear combination of the partial instance images of the specific part becomes minimized and that a sum of absolute values of the coefficients becomes minimized;

a deciding unit configured to decide, for each specific part of the input face image, a second linear combination of the partial instance images of the specific part stored in the storing unit in association with respective persons and each of a plurality of predetermined photographing conditions so that a weight for a partial instance image associated with each person in the second linear combination corresponds to the weight for the partial instance image associated with that person in the first linear combination of that part; and a generating unit configured to generate an approximate image of the input face image with respect to each of the predetermined photographing conditions, by synthesizing the second linear combinations obtained for the plurality of specific parts of the input face image for each predetermined photographing condition.

3. The image processing apparatus according to claim 2, wherein the approximating unit calculates the weight of the first linear combination by representing the specific part of the input face image and the partial instance images with vectors having pixel values arranged.

4. The image processing apparatus according to claim 2, wherein the approximating unit obtains the first linear combination while giving priority to a partial instance image similar to the specific part of the input face image.

5. The image processing apparatus according to claim 2, wherein the obtaining unit obtains the photographing condition by detecting it from the input face image.

6. The image processing apparatus according to claim 2, wherein
the deciding unit decides the second linear combination for each of the plurality of photographing conditions, and
the generating unit generates one approximate image for each of the plurality of photographing conditions.

7. The image processing apparatus according to claim 6, wherein the at least one processor is configured to execute the computer-executable instructions to further implement:
a registering unit configured to, for each of a plurality of input face images, associate each of the approximate images generated for each of the plurality of photographing conditions with the person whose face is in the input face image and register the associated approximate image as a registration image of the person for the photographing condition;
a calculating unit configured to calculate similarity between a newly input face image and each of a plurality of registration images; and
a discriminating unit configured to discriminate the newly input face image based on the similarity calculated for each of the plurality of registration images.

8. The image processing apparatus according to claim 2, wherein the at least one processor is configured to execute the computer-executable instructions to further implement:
a registering unit configured to, for each of a plurality of input face images, associate the approximate image generated by the generating unit with the person whose face is in the input face image and register the associated approximate image as a registration image of the person for a different photographing condition;
a calculating unit configured to calculate similarity between the face image generated from a newly input face image by the generating unit and each of the plurality of registration images; and
a discriminating unit configured to discriminate the newly input face image based on the similarity calculated for each of the plurality of registration images.

9. The image processing apparatus according to claim 2, wherein the photographing condition includes a direction of the face in the face image.

10. The image processing apparatus according to claim 2, wherein the photographing condition includes an illumination condition.

11. The image processing apparatus according to claim 2, wherein the photographing condition includes resolution.

12. The image processing apparatus according to claim 2, wherein the photographing condition includes a photographing time.

13. The image processing apparatus according to claim 2, wherein the photographing condition includes an expression of the face in the face image.

14. A non-transitory computer-readable storage medium storing a program which causes a computer to execute steps of:
storing in advance, as partial instance images in a storing unit, a plurality of partial face images obtained by photographing a face image of each of a plurality of persons on a plurality of photographing conditions and extracting a plurality of specific parts from each photographed face image, while associating each of the specific parts with a corresponding person and a corresponding photographing condition;
obtaining a photographing condition of an input face image;
approximating, for each of the specific parts, a specific part of the input face image by a first linear combination of the partial instance images of the specific part stored in the storing unit in association with respective persons and the photographing condition corresponding to the photographing condition of the input face image;
determining coefficients in the first linear combination so that a difference between the specific part of the input face image and the first linear combination of the partial instance images of the specific part becomes minimized and that a sum of absolute values of the coefficients becomes minimized;

deciding, for each specific part of the input face image, a second linear combination of the partial instance images of the specific part stored in the storing unit in association with respective persons and each of a plurality of predetermined photographing conditions so that a weight for a partial instance image associated with each person in the second linear combination corresponds to the weight for the partial instance image associated with that person in the first linear combination of that part; and generating an approximate image of the input face image with respect to each of the plurality of predetermined photographing conditions, by synthesizing the second linear combinations obtained for a plurality of specific parts of the input face image.

\* \* \* \* \*